United States Patent
Da Pont et al.

(10) Patent No.: US 9,562,620 B2
(45) Date of Patent: Feb. 7, 2017

(54) VALVE DEVICE FOR CONTROLLING A FLUID FLOW, IN PARTICULAR FOR CONTROLLING THE COLD AIR FLOW IN A HOUSEHOLD APPLIANCE, SUCH AS A REFRIGERATOR

(71) Applicant: ELBI International S.p.A., Turin (IT)

(72) Inventors: Paolo Da Pont, Collegno (IT); Giosue Capizzi, Turin (IT); Michele Farano, Turin (IT)

(73) Assignee: ELBI INTERNATIONAL S.P.A., Turin (IT)

( * ) Notice: Subject to any disclaimer, the term of this patent is extended or adjusted under 35 U.S.C. 154(b) by 0 days.

(21) Appl. No.: 14/649,479

(22) PCT Filed: Dec. 2, 2013

(86) PCT No.: PCT/IB2013/060553
§ 371 (c)(1),
(2) Date: Jun. 3, 2015

(87) PCT Pub. No.: WO2014/087312
PCT Pub. Date: Jun. 12, 2014

(65) Prior Publication Data
US 2015/0300519 A1    Oct. 22, 2015

(30) Foreign Application Priority Data
Dec. 3, 2012  (IT) .............................. TO2012A1038

(51) Int. Cl.
*F16K 31/02*    (2006.01)
*F16K 31/00*    (2006.01)
(Continued)

(52) U.S. Cl.
CPC ............ *F16K 31/002* (2013.01); *F16K 31/025* (2013.01); *F16K 31/10* (2013.01); *F16K 31/56* (2013.01);
(Continued)

(58) Field of Classification Search
CPC ........ F16K 31/002; F16K 31/10; F16K 31/56; F16K 37/0041; F15D 17/045
(Continued)

(56) References Cited

U.S. PATENT DOCUMENTS 2,962,049 A * 11/1960 Lauterbach ........... F16K 31/025
137/624.13
3,215,396 A * 11/1965 Bergsma ............... F16K 31/025
236/68 R
(Continued)

FOREIGN PATENT DOCUMENTS

DE     103 16 209    11/2003
EP     0 905 461     3/1999

OTHER PUBLICATIONS

International Search Report for International Application No. PCT/IB2013/060553 mailed Mar. 10, 2014 (3 pages).

*Primary Examiner* — Umashankar Vankatesan
(74) *Attorney, Agent, or Firm* — Merchant & Gould P.C.

(57) ABSTRACT

A device (10; 110; 210; 310) includes a support structure (12), on which there are mounted a plug (16), which is adapted to assume a plurality of operating positions including an opening position and a closing position, in which the plug is adapted to at least partially free and respectively obstruct a passage (14), which is meant for a fluid flow. A mechanism (18) is suited to move and hold the plug (16) between said operating positions. An opening actuator (20) and a closing actuator (22) are suited to separately act upon the mechanism (18), so that the mechanism (18) moves and holds the plug (16) between said operating positions, namely
(Continued)

towards said opening position and towards said closing position, respectively, due to electric current supplied to the opening actuator (20) and to the closing actuator respectively.

32 Claims, 14 Drawing Sheets

(51) Int. Cl.
    *F25D 17/04*     (2006.01)
    *F16K 37/00*     (2006.01)
    *F16K 31/10*     (2006.01)
    *F16K 31/56*     (2006.01)

(52) U.S. Cl.
    CPC ......... *F16K 37/0041* (2013.01); *F25D 17/045* (2013.01)

(58) Field of Classification Search
    USPC .................................. 251/129.06, 129.04, 11
    See application file for complete search history.

(56) References Cited

U.S. PATENT DOCUMENTS

| | | | | |
|---|---|---|---|---|
| 4,688,393 | A | * | 8/1987 | Linstromberg ....... F25D 17/045 62/180 |
| 5,490,395 | A | * | 2/1996 | Williams ................ F24F 13/12 137/625.3 |
| 5,684,448 | A | * | 11/1997 | Jacobsen ............ H01H 61/0107 337/123 |
| 5,816,061 | A | | 10/1998 | Lee et al. |
| 6,044,659 | A | * | 4/2000 | Ji .......................... F25D 17/045 62/186 |
| 6,910,340 | B2 | * | 6/2005 | Nowak ................ F25D 17/045 236/49.5 |
| 6,997,430 | B2 | * | 2/2006 | Denning ............... F16K 31/047 251/129.11 |
| 2008/0257086 | A1 | | 10/2008 | Noritake |

\* cited by examiner

VALVE DEVICE FOR CONTROLLING A FLUID FLOW, IN PARTICULAR FOR CONTROLLING THE COLD AIR FLOW IN A HOUSEHOLD APPLIANCE, SUCH AS A REFRIGERATOR

This application is a National Stage Application of PCT/IB2013/060553, filed 2 Dec. 2013, which claims benefit of Serial No. TO2012A001038, filed 3 Dec. 2012 in Italy and which applications are incorporated herein by reference. To the extent appropriate, a claim of priority is made to each of the above disclosed applications.

TECHNICAL FIELD

The present invention is relative to a valve device to control a fluid flow, in particular to control the cold air flow in a household appliance, such as a refrigerator.

TECHNOLOGICAL BACKGROUND

In the technical field of refrigerators, valve devices are known, which are used to control a cold air flow, so as to allow the temperature in the refrigeration chamber or cell to be controlled.

A device of this type, which is also known as a damper, generally operates by controlling a plug, which selectively frees and obstructs a passage, which is meant for a cold air flow to get through, the cold air flowing by being suited to perform a heat exchange in the refrigeration chamber or cell. Typically, the above-mentioned heat exchange takes place by temporarily allowing the cold air coming from the freezing chamber or cell of the refrigerator, which has a lower temperature (in general, equal to a value ranging from approximately −18° C. to approximately −20° C.), to flow to the refrigeration chamber or cell, which has a higher temperature (in general, equal to a value ranging from approximately 0° C. to approximately −4° C.)

Hence, by freeing and obstructing the passage according to predetermined criteria, for example with a thermostatic kind of control, the device is able to permit the adjustment of the total quantity of cold air flowing through the passage in order to reach the refrigeration chamber or cell, so that it can assume the temperature value desired, which can typically be selected by the user.

In the technical field, valve devices of the type described above are known, which use electric motors of the stepper type or low-power synchronous motors, which are connected to the plug, so as to move it between the opening position and the closing position.

This technical solution, though, has many drawbacks, among which there is the high noise mainly due to the "jerk" operation that characterizes the electric motor of the stepper type, which tends to produce vibrations that can normally be perceived in a significant manner, in particular in slow running mode.

In the art are known some devices as described in their respective documents.

For instance, DE 10316209 A1 discloses a damper that consists of a fixed frame with guides in which a moving element slides. The degree to which the slots coincide controls the air flow. Two form memory wires of e.g. nickel-titanium alloy are each fixed at one end to the frame and at the other end to the moving element. These wires contract when heated by an electric current and alter the position of the moving element to control the air flow.

According to US 2008/257086 A1, a driving force transmission mechanism in a motor type damper device, when a small AC synchronous motor rotates in one direction and a tooth-missing gear part of a tooth-missing gear engages with the first rack part of a rack member the rack member is moved upward to operate a baffle in an open direction and, when the tooth-missing gear part engages with the second rack part of the rack member, the rack member is moved downward to operate the baffle in a close direction. In this manner, even when the baffle and the rack member are operated in both directions, the tooth-missing gear is required to be rotated in only one direction and the rotation of the small AC synchronous motor is not required to be reversed. Therefore, the structure of a control circuit for the motor type damper device can be simplified.

U.S. Pat. No. 5,816,061 A discloses an apparatus and method for controlling the temperature in a refrigerating chamber of a refrigerator by supplying appropriate cooled air to each of the compartments of the refrigerating chamber according to a temperature in each of the compartments. A cooled air controlling plate is provided for controlling the size of the cooled air discharge outlet according to the individual temperatures in the compartments. The cooled air controlling plate is moved in an up and down direction in multiple stages depending on the temperature in the refrigerating chamber to control the cooled air discharge rate to each of the compartments of the refrigerating chamber so as to make the temperature in the refrigerating chamber uniform.

According to EP 0905461 A2, cool air is fed into a compartment of a refrigerator through a plurality of apertures. The air flow is directed up and down by pivotable blades associated with respective apertures. The apertures can be blocked by pivoting the blades to the maximum extent.

SUMMARY OF THE INVENTION

An object of the present invention is to provide an improved valve device to control a fluid flow, in particular but not exclusively to control the cold air flow in a household appliance, such as a refrigerator. A further object of the present invention is to provide a valve device having an operating system provided with a high reliability, which can be manufactured in a simple and economic fashion.

BRIEF DESCRIPTION OF THE DRAWINGS

Further features and advantages of the present invention will be best understood upon perusal of the following detailed description, which is provided by way of example and is not limiting, with reference to the accompanying drawings, which specifically show what follows.

DETAILED DESCRIPTION OF THE INVENTION

Figure 1:
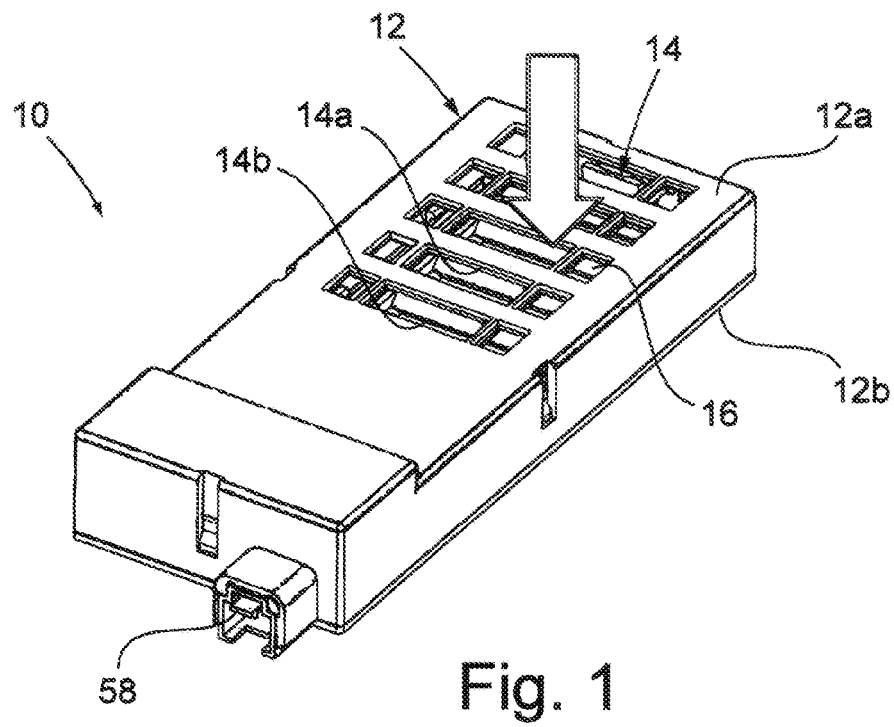
FIGS. 1 and 2 are prospective views from the top and, respectively, from the bottom of an exemplary embodiment of a device according to the present invention.

With reference to the figures from 1 to 7, an exemplary embodiment of a valve device 10 according to the present invention will be described hereinafter. This device is suited to control a fluid flow, in particular to control the cold air flow in a household appliance, such as a refrigerator.

Though, as a skilled person can clearly understand, the preferred use described for device 10 should not be interpreted as strictly restrictive. As a matter of fact, according to the present invention, the device can also be effectively used in other application fields where no fluid flow control needs to be performed.

Device 10 comprises a support structure 12, on which there are mounted:

a plug 16, which is suited to assume a plurality of operating conditions including an opening position and a closing position, in which the plug is adapted to at least partially free and respectively obstruct a passage 14, which is meant for the fluid flow to get through;

a mechanism 18, which is suited to move and hold the plug 16 between the operating positions; and an opening actuator 20 and a closing actuator 22, which are suited to separately act upon mechanism 18, so that said mechanism 18 moves and holds plug 16 between the operating positions, namely towards the opening position and towards said closing position, respectively, due to the feeding (e.g. by means of an impulse) of electric current, which is supplied to opening actuator 20 and to closing actuator 22 respectively.

In this embodiment, plug 16 is able to selectively assume the opening position or the closing position, without the need for further intermediate positions to be taken on by plug 16. On the other hand, as described below, other embodiments of the present invention envisage the presence of one ore more intermediate positions to be taken on by the plug between the "extreme" opening and closing positions, so as to allow the free section of the passage to be partially closed and, thus, permit different fluid flow rates through the device.

Furthermore, in the embodiments shown, device 10 is designed in such a way that an electric current is selectively supplied only to opening actuator 20 or to closing actuator 22, so that they can be operated in an alternate, separate and independent manner, thus moving plug 16 towards the opening position or towards the closing position, so that mechanism 18 can hold plug 16 in the operating position reached at the end of the operation of actuator 20, 22 (indifferently an intermediate position or an "extreme" opening or closing position). In particular, in this embodiment, opening actuator 20 and closing actuator 22 are operated in an alternate manner, so as to bring plug 16 to the opening position and to the closing position, respectively, between a previous and a following operation.

Following an opening operation of actuator 20 (e.g. by means of a current impulse), plug 16 is brought (by moving it from the closing position) to the opening position and steadily held there, even when the passage of electric current through actuator 20 is interrupted. In this way, in the application of device 10 to a fridge, cold air is allowed to flow through the passage 14 for a suitable amount of time.

Subsequently, only when a closing operation of actuator 22 takes place (e.g. by means of a current impulse), plug 16 is brought (by moving it from the opening position) to the closing position and steadily held there, even when the passage of electric current through actuator is interrupted. In this way, in the application of device 10 to a refrigerator, cold air is prevented from flowing through passage 14, when the desired temperature is reached.

Preferably, mechanism 18 comprises a rotatory organ 23, which can rotate around a rotation axis X-X and upon which opening actuator 20 and closing actuator 22 act, and a rotatory element 24, which is torsionally constrained in an elastic manner to rotatory member 23 and cooperates with plug 16 so as to move plug 16 to the opening position and to the closing position. Obviously, plug 16 is moved by rotatory element 24 in response to an operation of opening actuator 20 and of closing actuator 22, respectively, which act upon rotatory organ 23.

Preferably, mechanism 18 envisages the adoption of restraining means 26, which tend to prevent at least one between mechanism 18 and plug 16 from moving from the position reached at the end of the operation of opening actuator 20 or of closing actuator 22, namely the opening position and the closing position, respectively. In other embodiments, as already mentioned, the position reached can correspond to an intermediate position. In any case, the position reached is maintained until a subsequent operation of closing actuator 22 and of opening actuator 20, respectively, which can overcome the inertia determined by restraining means 26.

Preferably, restraining means 26 are suited to exert a friction force on at least one between mechanism 18 and plug 16, so as to hinder a movement of mechanism 18 and of plug 16 from the respective position and configuration, in which they are arranged at the end of the operation of opening actuator 20 and of closing actuator 22. In particular, when opening actuator 20 and closing actuator 22 are operated by the passage of an electric current, they are designed to exert a force that is suited to overcome the opposite friction force of restraining means 26. In this embodiment, restraining means 26 act in this way upon mechanism 18 and, simultaneously, upon plug 16.

In alternative embodiments (see for example the embodiments shown in the figures from 8 to 14), restraining means 26 can be able to work so as to cause mechanism 18 to be actually bistable, which means tending to elastically push mechanism 18 and/or plug 16 to the configurations corresponding to the opening position and to the closing position of plug 16, respectively, combining the operation of opening actuator 20 and of closing actuator 22, respectively.

Preferably, at least one between opening actuator 20 and closing actuator 22—but preferably both of them—comprises an electrical conductor, which is made of a shape memory alloy (SMA) and is constrained to mechanism 18. In a known manner, the above mentioned alloys are able to assume a predetermined shape when they are subject to heating, typically by means of a Joule effect due to a passage of electric current. Preferably, at least one between opening electrical conductor 20 and closing electrical conductor 22—but preferably both of them—has an oblong shape and is suited to assume an extended and de-energized normal condition and a contracted and energized working condition, in which it moves mechanism 18, thus bringing plug 16 to the opening position or to the closing position, respectively.

Preferably, rotatory member 23 and rotatory element 24 are torsionally constrained around the same rotation axis X-X. In particular, the mechanical connection between rotatory member 23 and rotatory element 24 creates a torsional joint of the elastic type.

Figure 4:
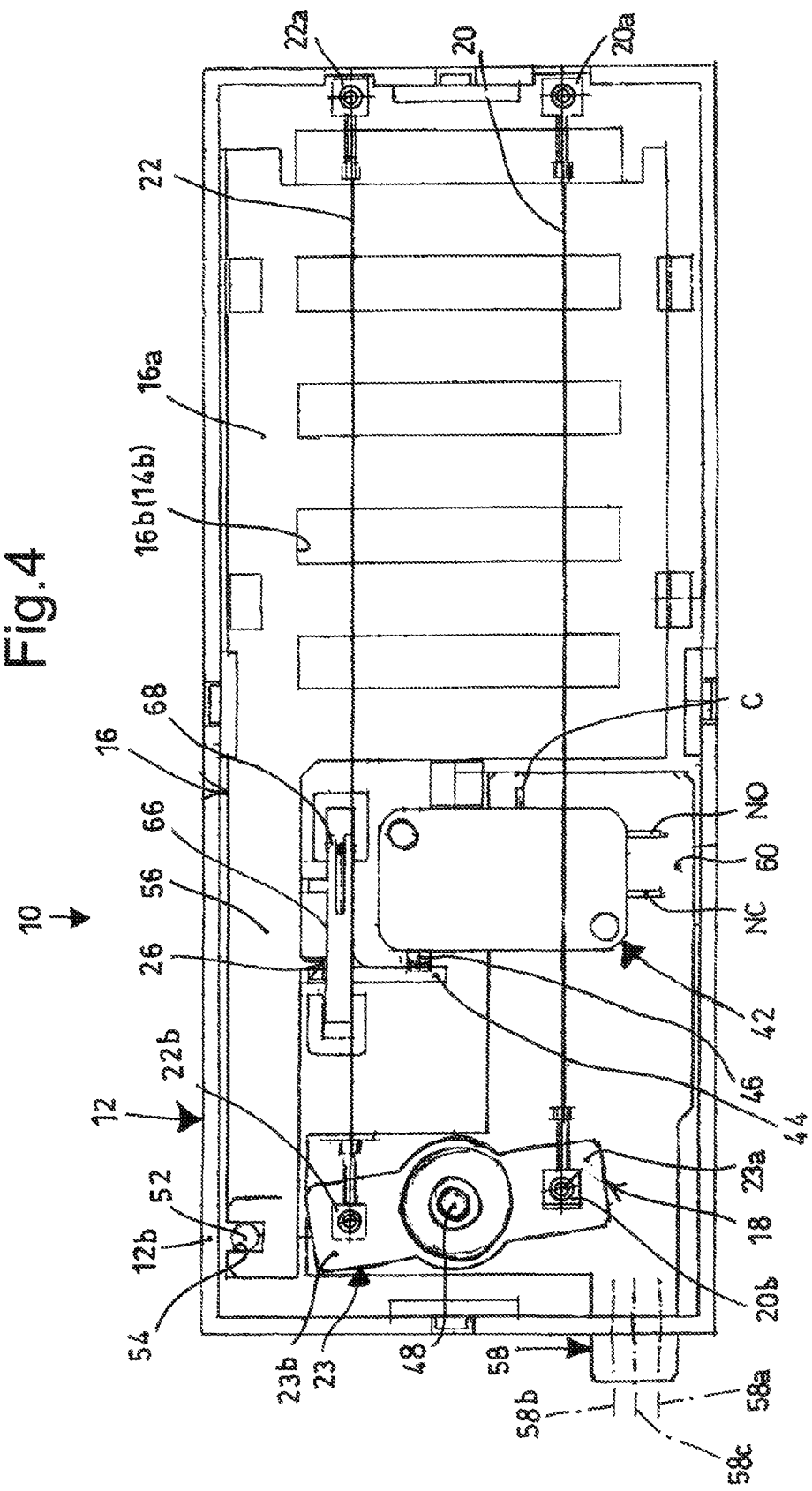
FIG. 4 is a plan view from the top of the device shown in FIG. 3.
Figure 5:
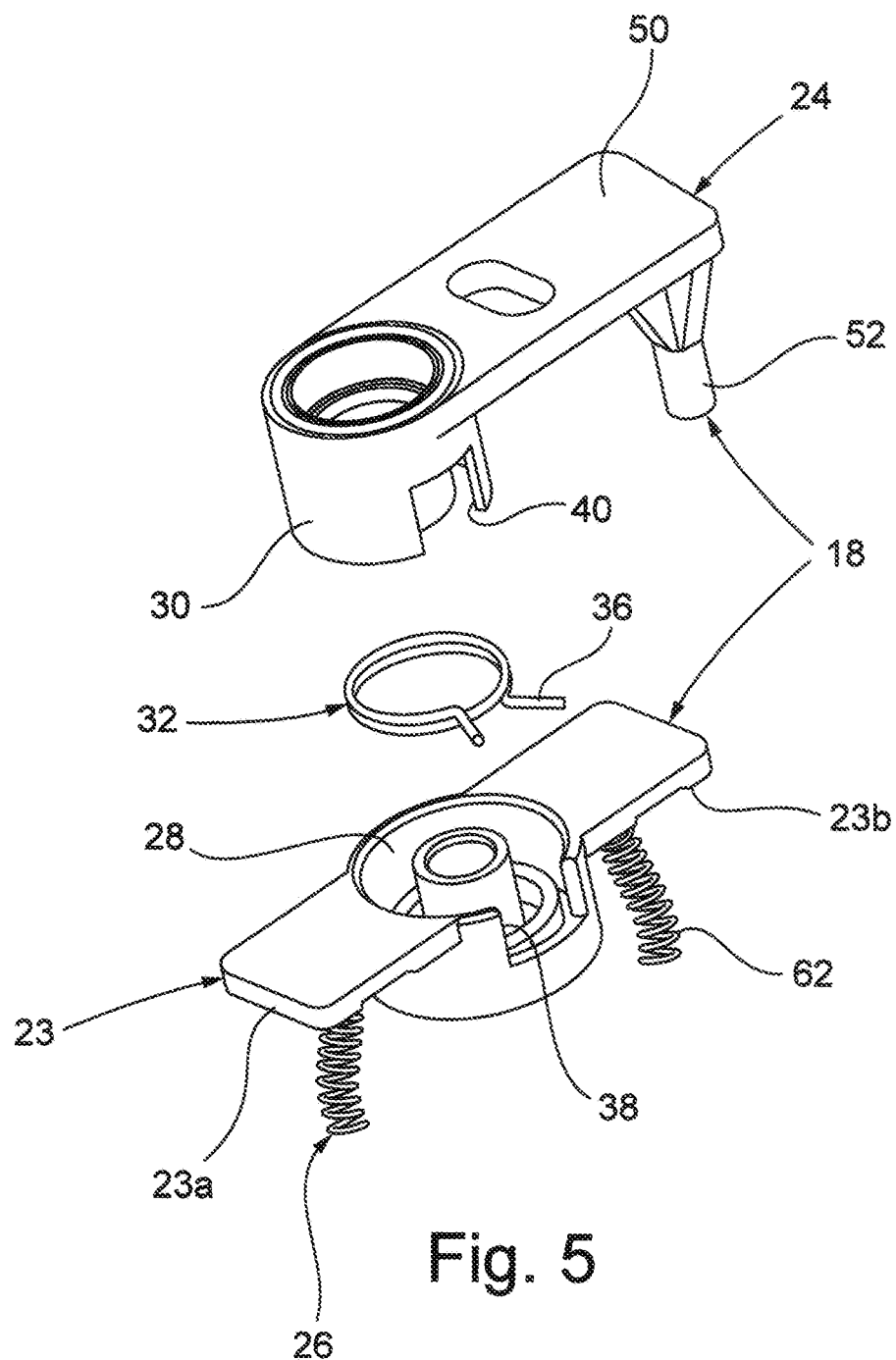
FIG. 5 is an exploded prospective view of an assembly of components of the device shown in the previous figures.

With reference, in particular, to FIGS. 4 and 5, rotatory member 23 and rotatory element 24 preferably have respective cylindrical portions 28 and 30, which are rotoidally coupled to one another and between which elastic means 32 are interposed, which tend to hold rotatory member and rotatory element 24 in a predetermined mutual angular position.

Preferably, the elastic means comprise a torsionally loaded spring 32, which is annularly interposed between cylindrical portions 28 and 30, so as to torsionally constrain rotatory member 23 and rotatory element 24.

With reference, in particular, to FIG. 5, spring 32 is preferably of the helical type and is housed in an annular cavity 34, which is defined in one between cylindrical portion 28 of rotatory member 23 and cylindrical portion 30 of rotatory element 24. Ends 36 of spring 32 act upon both cylindrical portions 28 and 30. In this embodiment, annular cavity 24 is defined in cylindrical portion 30 of rotatory element 24.

Preferably, stressing ends 36 extend through respective peripheral grooves 38 and 40, which face one another and are obtained on cylindrical portions 28 and 30, stressing ends 36 resting on the edges defined by peripheral grooves 38 and 40.

Preferably, device comprises control means 42, which cooperate with at least one between plug 16 and mechanism and are suited to directly or indirectly affect an electric current supplied to at least one between opening actuator 20 and closing actuator 22 as a function of the operating position assumed by said plug 16.

In this embodiment, the control means comprise a switching apparatus 42, which is mounted on support structure 12 and cooperates with at least one between plug 16 and mechanism 18, so as to directly or indirectly affect the above-mentioned electric current as a function of the position assumed by plug 16. In particular, switching apparatus 42 is suited to prevent an electric current from being supplied to at least one between (but more preferably to both):

opening actuator 20, when mechanism 18 has moved plug 16 to the opening position (FIGS. 3 and 4), and closing actuator 22, when mechanism 18 has moved plug 16 to the closing position (not shown).

In particular, switching apparatus 42 can comprise different types of switches, such as a micro-switch, a Hall effect switch, and the like.

In this embodiment, plug 16 directly cooperates with switching apparatus 42.

Preferably, switching apparatus 42 is configured to allow an electric current to be supplied to at least one between (but more preferably to both):

opening actuator 20, when mechanism 18 has moved plug 16 to the closing position, and closing actuator 22, when mechanism 18 has moved plug 16 to the opening position.

In this embodiment, the switching apparatus comprises a diverter switch 42, which can be operated by at least one between mechanism 18 and plug 16, so as to selectively direct an electric current through opening actuator 20 and closing actuator 22, when mechanism 18 has moved plug 16 to the closing position and to the opening position, respectively.

In this embodiment, diverter switch 42 is directly operated by plug 16; though, in further embodiments, diverter switch 42 can be configured so as to be operated by mechanism 18 (by way of example, see the embodiments shown in the figures from 8 to 14).

Preferably, diverter switch 42 has a structure of the type known in the technical field as SPDT, which stands for "Single Pole, Double Throw".

In particular, diverter switch 42 comprises an opening terminal NO and a closing terminal NC, which are separate from one another and are electrically connected to opening actuator 20 and to closing actuator 22 respectively, and a common terminal C, which can be selectively connected to opening terminal NO and to closing terminal NC in a manner controlled by at least one between mechanism 18 and plug 16, when mechanism 18 has moved plug 16 to the closing position and to the opening position, respectively. In this embodiment, diverter switch 42 is a micro-switch 42 of the known type.

In this embodiment, plug 16 cooperates with micro-switch 42, in particular plug 16 is provided with a projection 44, which cooperates with an operating push-button 46 supported by micro-switch 42 and acts upon the contacts of the latter so as selectively prevent the electric current from being supplied to opening actuator 20 and to closing actuator 22. In particular, operating push-button 46 works so as to create, in a selective manner, an electrical contact between closing terminal NC and common terminal C (thus leaving opening terminal NO out) and, respectively, between opening terminal NO and common terminal C (thus leaving closing terminal NC out), when plug 16 reaches the opening position and, respectively, the closing position, in response to the thrust exerted by projection 44 moving closer to push-button 46 or away from it.

In particular, when plug 16 ends its movement to the closing position (not shown), the pressure of push-button 46 generated by projection 44 causes the opening of the electrical contact existing between common terminal C and closing terminal NC associated with closing actuator 22, thus interrupting a possible further undesired supply of electric current. Furthermore, the creation of an electric connection between common terminal C and opening terminal NO associated with opening actuator 20 takes place, so as to prepare device 10 for the following activation of opening actuator 20.

Similarly, when plug 16 ends its movement to the opening position (FIGS. 3 and 4), the lifting of projection 44 form push-button 46 causes the opening of the electrical contact existing between common terminal C and opening terminal NO, thus interrupting a possible further undesired supply of electric current. Furthermore, the creation of an electric connection between common terminal C and closing terminal NC takes place, so as to prepare device 10 for the following activation of closing actuator 22.

Preferably, support structure 12, which, for example, is made of an electrically insulating material (in particular, a plastic material), creates, as a whole, a casing that encompasses movable plug 16, mechanism, 18, opening actuator 20, closing actuator 22, and, if available, switching apparatus 42. In this embodiment, support structure 12 defines, on the inside, passage 14 itself. In further embodiments of the present invention, the support structure or casing can be manufactured as separate and distinct from the hollow body in which the passage for the fluid flow is obtained, in particular in case a solution with a rotatory plug is adopted.

Figure 2:
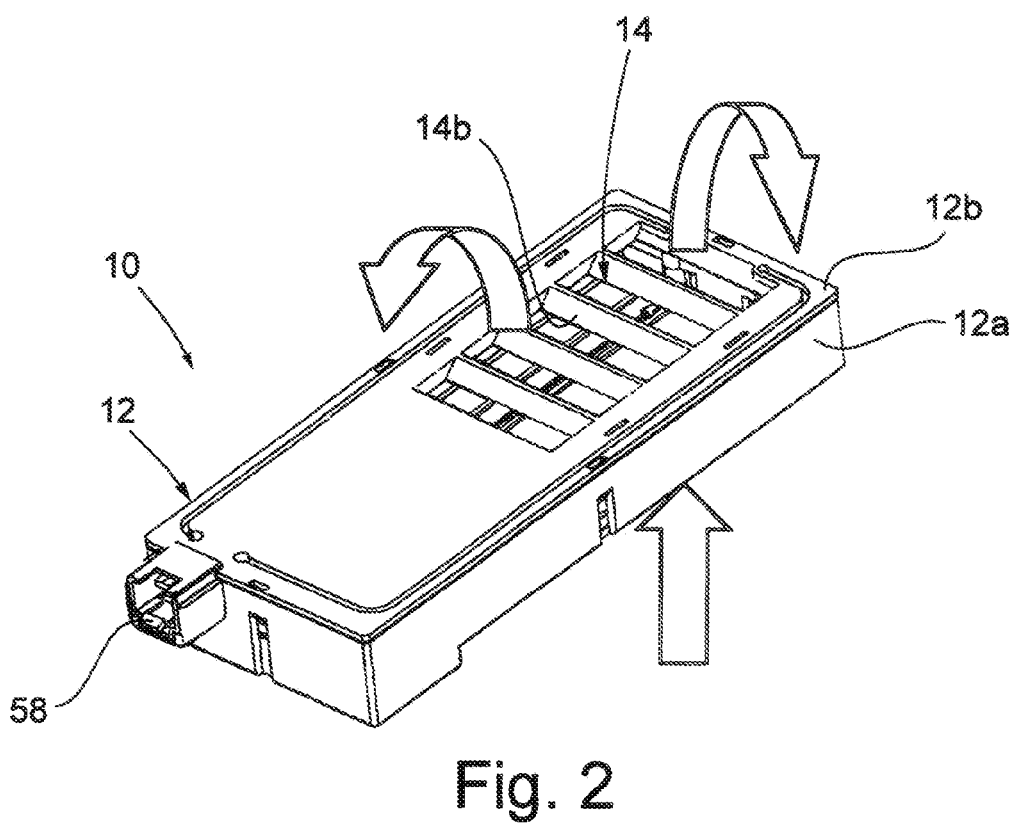

With reference, in particular, to FIGS. 1 and 2, in this embodiment support structure or casing 12 comprises a pair of elements or half-shells 12a and 12b, which can be coupled to one another, advantageously in a fluid-tight manner, in correspondence to their periphery. In particular, half-shell 12b is manufactured as substantially flat base, which is adapted to support the different components of device 10, whereas half-shell 12a is shaped as a cup, whose lateral walls are coupled to half-shell 12b. The coupling between half-shells 12a, 12b is performed, for example, by means of an interlocking coupling, through gluing or thanks to the use of screws.

In this embodiment, passage 14 is defined inside casing 12, in particular going through the half-shells 12a and 12b. Preferably, passage 14 has an inlet portion 14a and an outlet portion 14b, which are supported by opposite parts of casing 12 and, for example, are obtained on half-shell 12a and on half-shell 12b, respectively.

Figure 3:
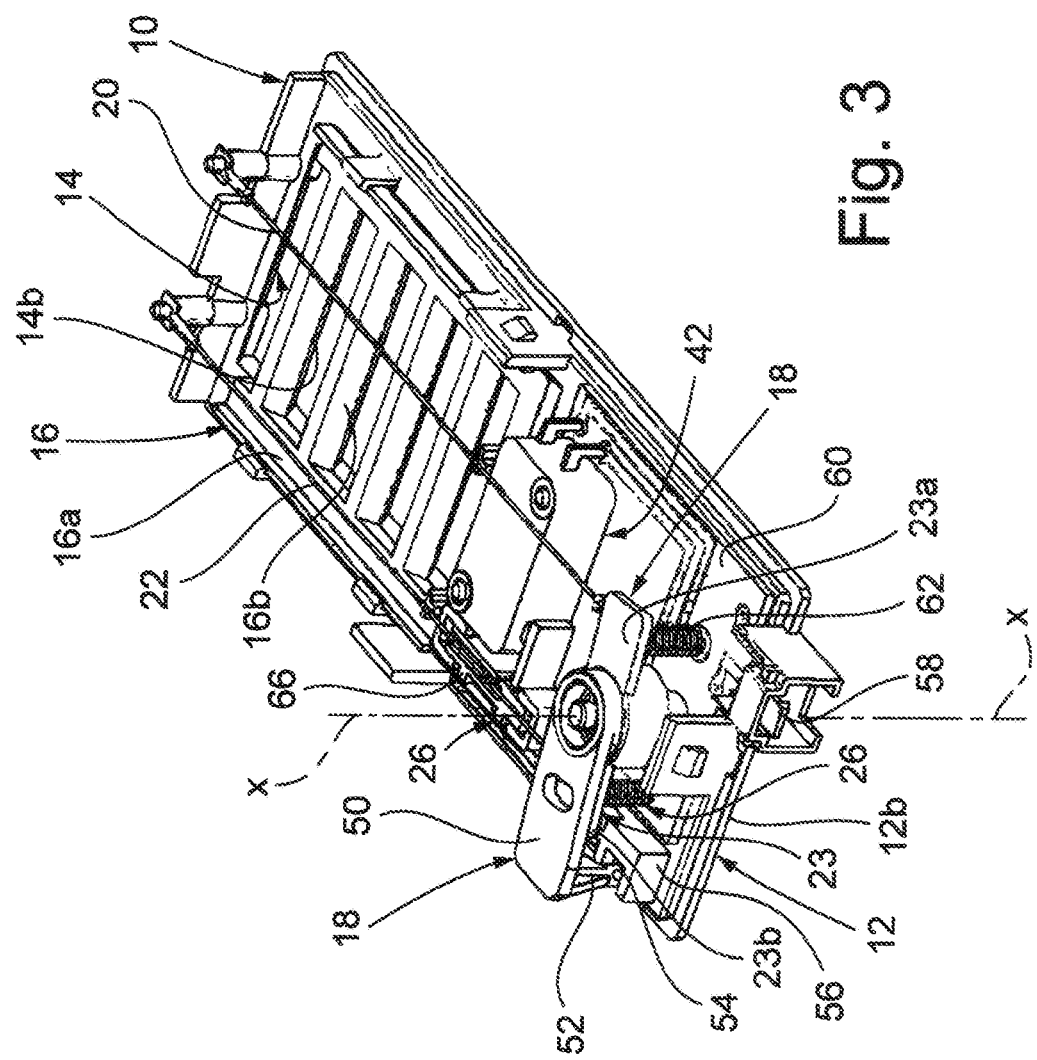
FIG. 3 is a partial prospective view according to a prospective that is similar to the one of FIG. 1, which shows the inner components of the device.

With reference, in particular, to FIG. 3, plug 16 is of the sliding type and, in so doing, in particular, it is guided in casing or hollow body 12, for example by inner walls and projections, which are properly shaped and supported by half-shell 12b. In the embodiment shown, plug 16 is associated with outlet portion 14b of passage 14, so as to obstruct and free it in a selective manner. Alternatively, plug 16 can also be associated with inlet portion 14a of above-mentioned passage 14.

Preferably, plug 16, for example comprising a plate 16a, has a shape that is substantially complementary to the shape of outlet portion 14b on which plug 16 slides between the opening position and the closing position. In particular, plug 16a is provided with a plurality of slits 16b, which have a shape that coincides with outlet incisions 14b of passage 14. In this embodiment, outlet incisions 14b and slits 16b are adapted to be aligned and staggered, respectively, when plug 16 is in the opening position and in the closing position, respectively. In further embodiments, in which plug 16 can assume one or more intermediate positions, slits 16b and incisions 14b can be arranged one on top of the other so as to be even partially aligned, in order to adjust the flow rate through passage 14 to intermediate values as a function of the relative position assumed by plug 16 and by outlet portion 14b of passage 14.

Preferably, rotatory member 23 fulfills the function of a rocker arm having two arms 23a, 23b, which extend on opposite sides relative to rotation axis X-X and cylindrical portion 28. In the embodiment shown, rotatory member 23 is pivoted in hollow body or casing 12, for example on the bottom of half-shell 12b, in correspondence to a pin 48. In particular, pin 48 defines rotation axis X-X.

Preferably, the rotation of rotatory member 23 around rotation axis X-X is determined by the operation of opening actuator 20 and of closing actuator 22, which act on opposite sides relative to rotation axis X-X, in particular upon opening arm 23a and upon closing arm 23b. In this embodiment, opening actuator 20 is suited to cause rotatory member 23 to rotate in an opening direction (namely in a counterclockwise direction, when observing FIG. 4), whereas closing actuator 22 is suited to cause rotatory member 23 to rotate in a closing direction that is opposite to the opening direction (namely in a clockwise direction, when observing FIG. 4).

Preferably, by means of the elastic torsional connection to rotatory element 24, rotatory member 23 affects the position assumed by plug 16 (selectively, the opening position or the closing position). In the embodiment shown, rotatory element 24 comprises a lever 50, which is engaged with plug 16 so as to move it with a translation movement. In particular, lever 50 projects from one side of cylindrical portion 30; therefore, lever 50 creates a further "arm", which is elastically associated in a rotatory manner to the rocker arm defined by rotatory member 23, and cooperates with plug 16, so as to control its movement as a function of the angular position (opening position and closing position—or, if necessary, intermediate position) assumed by rotatory member 23 due to the activation of opening actuator 20 and of closing actuator 22, respectively.

Preferably, plug 16 and rotatory element 24 create a kinematic mechanism, in which plug 16 is able to translate, guided by casing 12, for example by lower half-shell 12b, so as to be constrained to the rotation of rotatory element 24, which is able to rotate so as to be torsionally constrained to rotatory member 23, in particular around the same axis X-X. In other words, rotatory element 24 acts as a "crank", which is directly coupled, with a (radial) clearance, to plug 16, which slides acting as a cursor. In this embodiment, lever 50 and plug 16 form the above-mentioned kinematic mechanism.

Preferably, lever 50 comprises an appendage 52, which is coupled, with a (radial) clearance, in a seat 54 obtained on plug 16, for example on a prolongation 56, possibly substantially shaped as a rod, which projects from plate 16a, for example from a side thereof. In particular, prolongation 56 is coplanar to plate 16a.

Preferably, at least one between opening electrical conductor 20 and closing electrical conductor 22—but preferably both of them—is manufactured as a wire constrained to support structure 12 and, at the same time, to mechanism 18, in particular to rotatory member 23, and is able to shift from the extended condition to the contracted position, thus stressing, by pulling, rotatory member 23, so as to bring it to the configuration corresponding to the opening position or to the closing position (or, if necessary, to an intermediate position) of plug 16. According to this configuration, the optional presence of the elastic torsional constraint between rotatory member 23 and rotatory element 24 has the advantage of allowing the correct tautness state of the wire/s to be resumed when they/it return/s from the contracted condition to the extended condition, thus preventing it/them from slackening, which might jeopardize the correct functioning of mechanism 18.

With reference, in particular, to FIGS. 3 and 4, in the embodiment shown, opening actuator wire 20 is in the extended condition and is mechanically connected, on one side, for example by means of a contact 20a, to support body 12 (in particular, in correspondence to a projection supported by lower half-shell 12b) and, on the other side, for example by means of a further contact 20b, to opening arm 23a (in particular, in correspondence to a further projection). Similarly, closing actuator wire 22 is in the extended condition and is mechanically connected, on one side, for example by means of a contact 22a, to support body 12 (in particular, by a pin supported by lower half-shell 12b) and, on the other side, by means of a further contact 22b, to opening arm 23a (in particular, in correspondence to a further projection). Optionally, one or more of contacts 20a, 22a, 20b, 22b is a lamella contact.

Preferably, the electric connection of actuators 20 and 22 to the electric source of energizing current is performed by means of a connector 58, which is supported by support structure 12. In this embodiment, connector 58 is a three-way connector, for example of the RAST type, in which an opening input 58a, a closing input 58b and a common output 58c are provided. When one wants to activate opening actuator 20, one has to generate a passage of electric current between opening input 58a and common output 58c. On the other hand, when one wants to activate closing actuator 22, one has to generate a passage of electric current between closing input 58b and common output 58c.

Preferably, between actuators 20, 22 and the terminals of connector 58 there is electrically interposed a printed circuit board (PCB) 60. In this embodiment, printed circuit board 60 comprises an insulating substrate and a series of tracks obtained on the latter, which are adapted to permit a connection between actuators 20, 22 and connector 58, in particular through switching apparatus 42 (for example, with terminals NO, NC C). In this embodiment printed circuit board 60 is mounted on the base of lower-half shell 12b.

Figure 7:
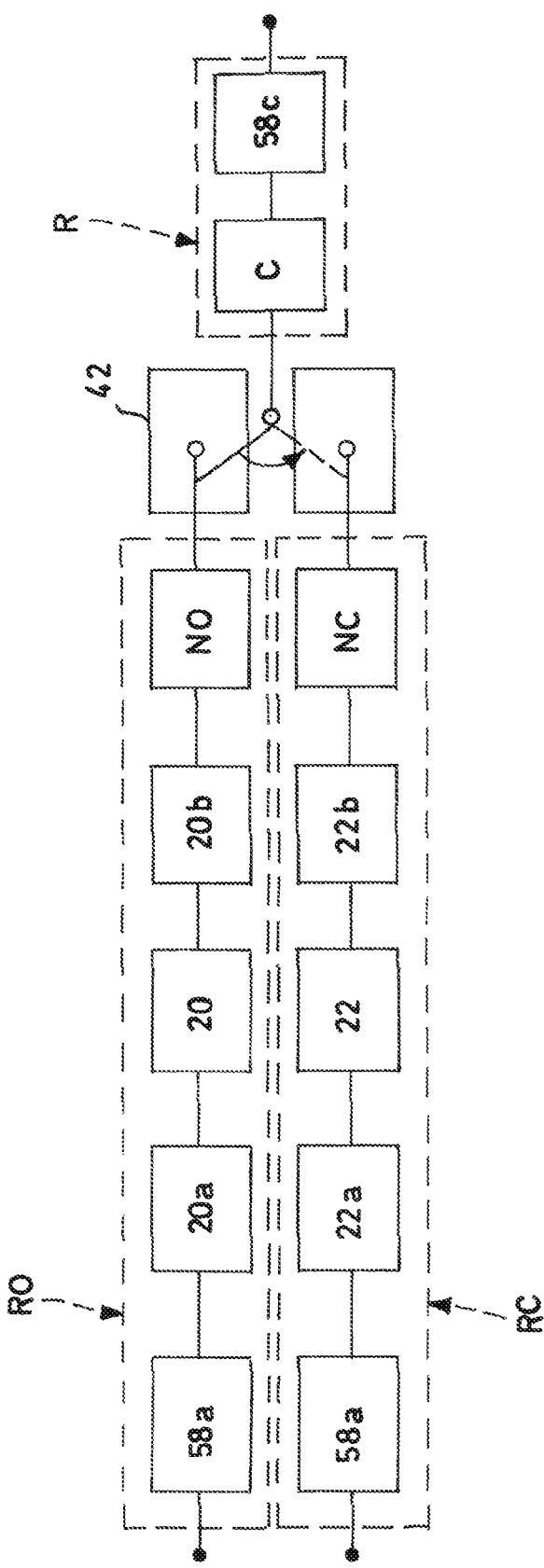
FIG. 7 is a schematic diagram representing an electrical control circuit associated with the device shown in the previous figures.
Figure 8:
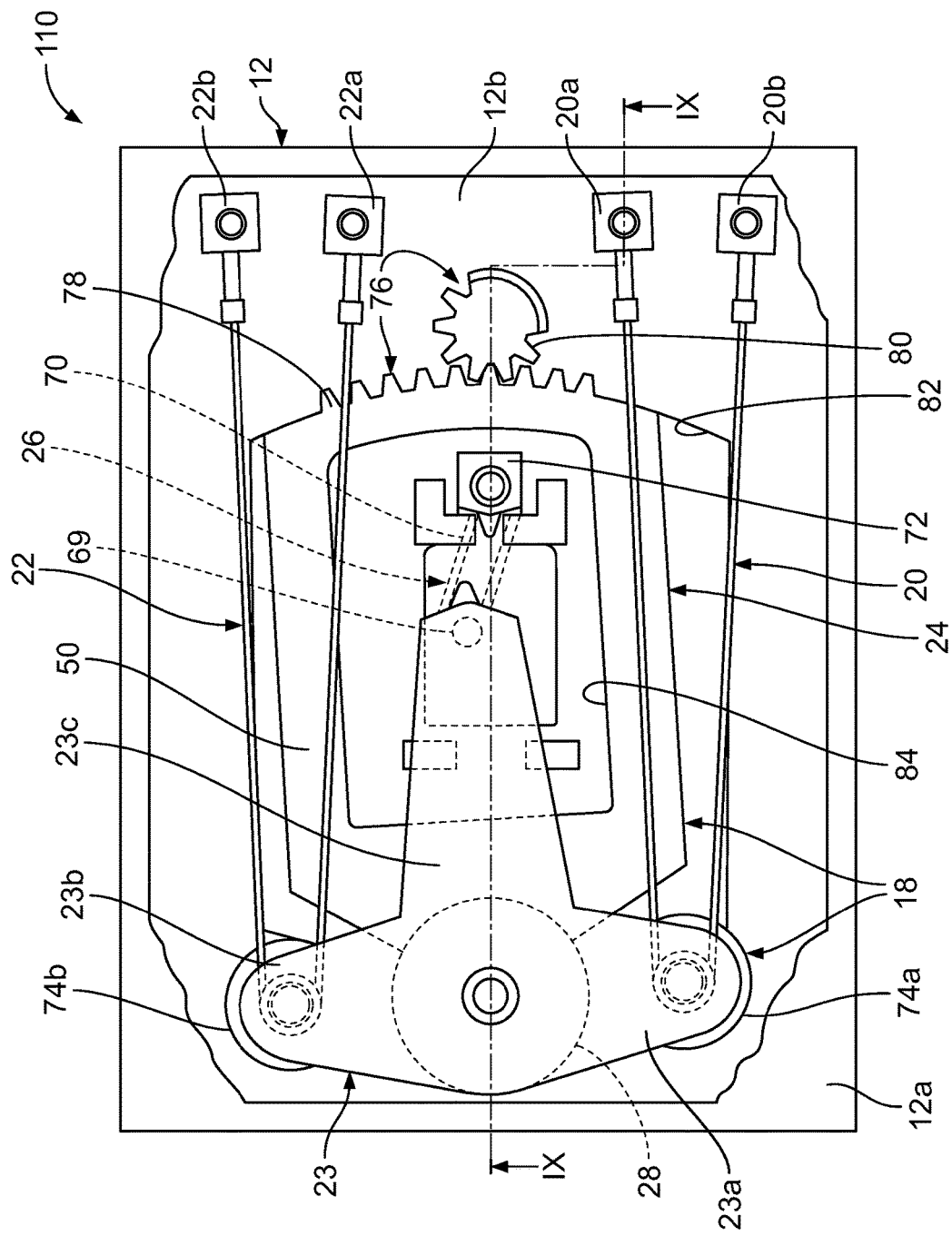
FIG. 8 is a plan view from the top partially showing, in a cutaway drawing, a further exemplary embodiment of a device according to the present invention.
Figure 9:
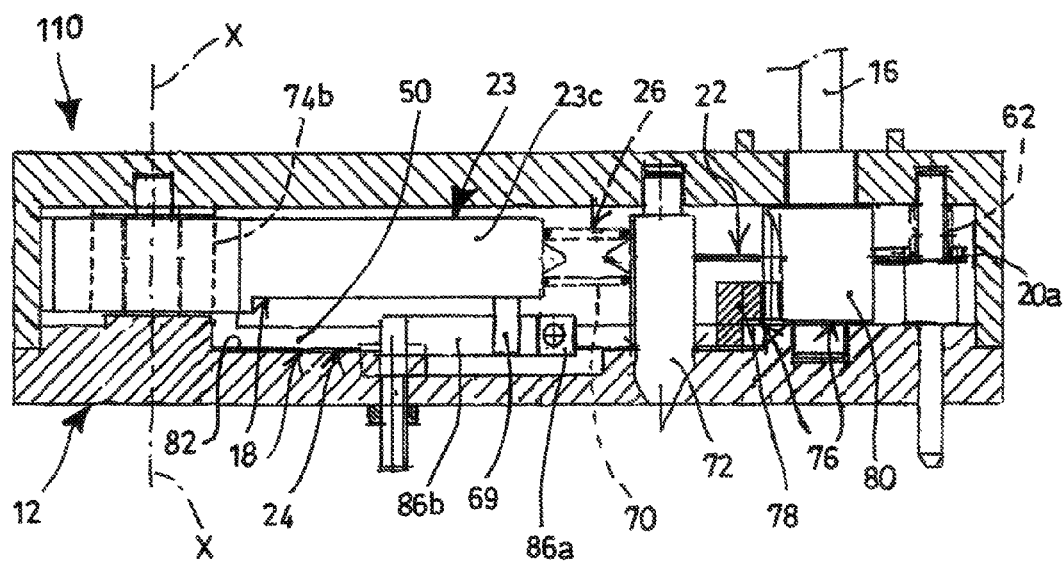
FIG. 9 is a cross-section view of the above-mentioned device obtained through the line IX-IX shown in FIG. 8.

With reference, in particular, to FIG. 7, the drawing shows, in a schematic and merely functional way, the electrical control circuit created, by way of example, by device 10. More in detail, the circuit comprises:

an opening branch RO created by opening input 58a, which is electrically connected, by means of known measures (e.g. through the tracks of printed circuit board 60), to opening actuator 20, which is connected to opening terminal NO of switching apparatus 42;

an closing branch RC created by terminal 58b, which is electrically connected, by means of known measures (e.g. through the tracks of printed circuit board 60), to closing actuator 22, which is connected to closing terminal NC of switching apparatus 42; and a common branch R created by terminal 58c, which is electrically connected, by means of known measures (e.g. through the tracks of printed circuit board 60), to common terminal C of switching apparatus 42.

In this way, switching apparatus 42 alternately connects common branch R to opening branch RO and closing branch RC, when plug 16 has completely reached the closing position (thus interrupting a possible undesired passage of current through closing branch RC and common branch R) and the opening position (thus interrupting a possible undesired passage of current through opening branch RO and common branch R), respectively.

In this embodiment, plug 16 directly cooperates with switching apparatus 42, in particular by means of the thrust exerted by projection 44 on push-button 46, thus providing a direct indication of the actual reaching of the opening position or of the closing position.

In this embodiment, restraining means 26 comprise at least one friction element 62, which is arranged between support body 12, for example lower half-shell 12b, and mechanism 18, for example rotatory member 23, and tends to counter a rotation of the latter by exerting a friction force thereon. Preferably, restraining means 26 comprise a pair of elastic elements 62, which act upon rotatory member 23, in particular on arms 23a and 23b.

Preferably, elastic elements 62 are made of an electrically conductor material and help create an electrical connection between each one of contacts 20b, 22b and the tracks of printed circuit board 60, which connect actuators 20, 22 to terminals NO, NC of switching means 42.

Figure 6:
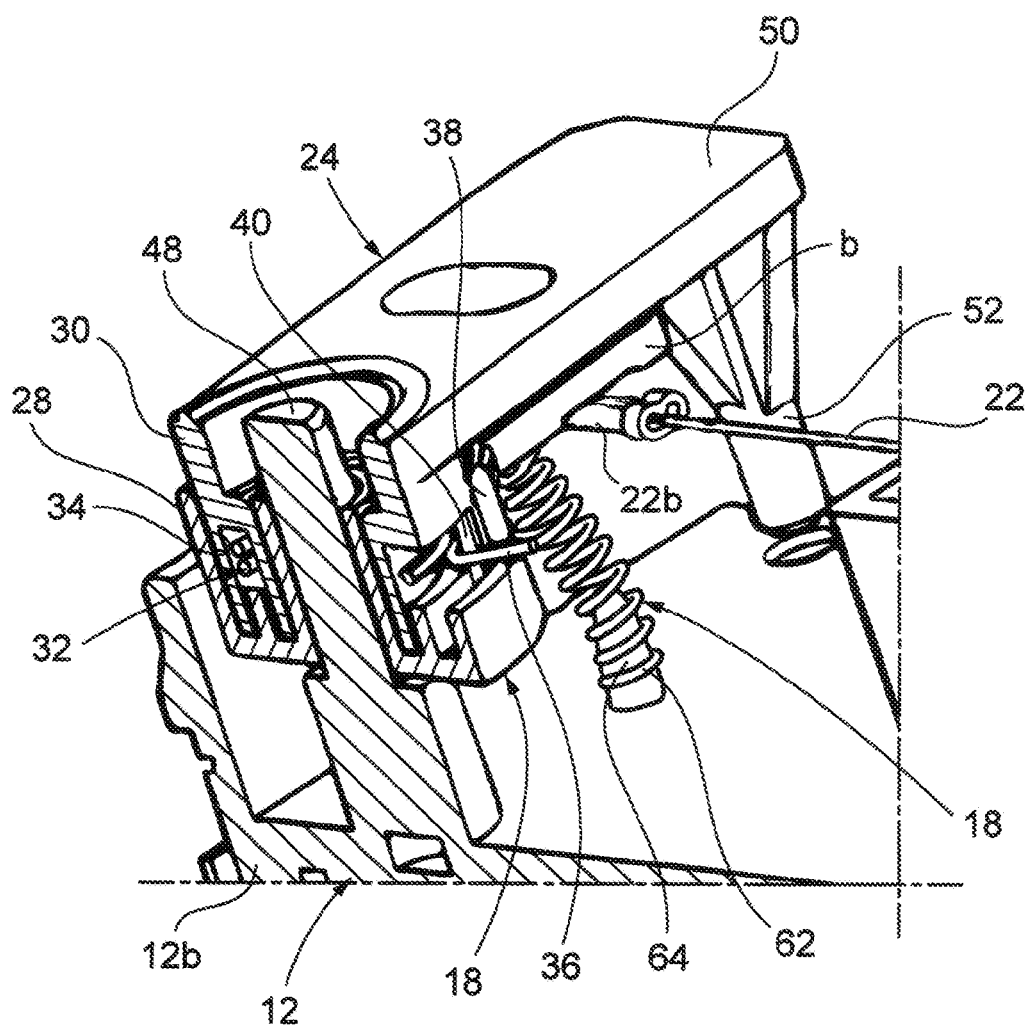
FIG. 6 is a prospective cross-section of the assembly of components, assembled together, shown in FIG. 5.

In particular, the elastic elements are compression-loaded helical springs 62, which are fitted around pins 64 (FIG. 6) projecting from support body 12, for example from its lower half-shell 12b.

Optionally, restraining means 26 comprise a cursor 66, which is mounted on plug 16 and is constrained, so as to slide, on support body 12, for example on lower half-shell 12b. Cursor 66 is suited to exert a friction on support structure 12, so as to hinder the movement of plug 16 by holding it in its position until the activation of opening actuator 20 or of closing actuator 22, which exert on rotatory member 23 a force that is able to overcome the friction exerted by the cursor 66. With reference, in particular, to FIG. 4, the cursor 66 optionally comprises a pair or arms 68 acting upon walls that project from support structure 12—and, for example, are C-shaped an laterally surround arms 68. In particular, arms 68 are pushed, so as to spread apart, by an elastic element, which is interposed between them, such as a compression-loaded spring. In this way the arms are forcedly pushed against a wall of support structure 12 and, hence, are able to exert a force that counters the movement of mechanism 18 until a subsequent activation of one of the two actuators 20, 22.

With reference, in particular, to the figures from 8 to 11 and 11a, a further exemplary embodiment of a valve device 10 according to the present invention will be described hereinafter.

Details and elements that are similar to those of the embodiment described above or fulfill a similar function are associated with the same alphanumeric references. For the sake of brevity, the description of these details and elements will not be repeated below, but reference is made to what was previously explained in the description of the previous embodiment, except for some main differences, which will be described in the following description.

In the figures from 8 to 11, valve device 110 is shown in a configuration of mechanism 18 corresponding to the opening position of plug 16.

Unlike the previous embodiment, plug 16 is of the of rotatory type, so as to oscillate between the opening position and the closing position. In this embodiment, plug extends, in particular through a shaft, outside of support structure 12 and, hence, is adapted to open and close a passage obtained in a hollow body that is separate from support structure 12 and acts as a casing for mechanism 18 and actuators 20 and 22. Typically, the obstructing function is performed by a solid plate of said plug 16, which is adapted to oscillate, for example with an angular range of approximately 90°, so as to lean against a suitable valve seat, in order to obstruct the latter in the closing position. Unlike the previous embodiment, the mechanism is suited to directly cooperate with switching apparatus 42, in particular by means of support member 23. Preferably, support member 23 comprises a prolongation 23c, which cooperates with switching apparatus 42, in particular by means of a projection 69, which is supported by prolongation 23c and is adapted to interrupt the connection of actuators 20 and 22 to the supply of electric current used to operate them.

Unlike the previous embodiment, mechanism 18 is manufactured in a bistable manner, which means that restraining means 26 act as return means, which tend to push mechanism 18 to the configuration corresponding to the opening position or to the closing position, substantially preventing mechanism 18—and consequently plug 16—from finding itself in intermediate conditions. Preferably, restraining means 26 comprise a spring 70, which acts, for example by means of an elastic compression pre-load, against mechanism 18. In this embodiment, spring 70 rests against rotatory member 23, in particular against prolongation 23c, for example creating an elastic connection of the "knee" type, which tends to let rotatory member 23 oscillate around rotation axis X-X from the intermediate configurations towards the stable opening configuration or the stable closing configuration. Advantageously but not necessarily, spring 70 is interposed between a pin 72, which is supported by support structure 12, and the distal end of prolongation 23c.

Unlike the embodiment described above, in case at least one of the actuators—and preferably both actuators—comprises an actuator wire 20, 22, the wire is constrained to mechanism 18, in particular to rotatory member 23, by means of a forced or dynamic coupling, for example by means of friction. Preferably, the above-mentioned forced coupling is performed thanks to the fact that opening actuator wire 20 and/or closing actuator wire is housed, with an intermediate segment of its, in a respective groove peripherally obtained in an opening pulley 74a and/or a closing pulley 74b, which is supported in a rotatory manner by rotatory member 23, in particular by arm 23a and/or by arm 23b. In this embodiment, opening actuator wire 20 and/or closing actuator wire 22 defines, with pulley 74a and/or 74b associated thereto, a loop or extended embracing bow, in particular with the shape of a semi-circumference.

Unlike the embodiment described above, contact 20b and/or 22b of actuator wire 20 and/or of actuator wire 22 is constrained to support structure 12, similarly to what happens with contact 20a and/or 22a. Preferably contacts 20a-b are one next to the other and/or the contacts 22a-b are one next to the other, so that actuator wire 20 and/or actuator wire 22, in use, is substantially U-shaped.

In this embodiment, opening pulley 74a and/or closing pulley 74b are mounted so as to rotate around a respective axis, which is parallel to rotation axis X-X of rotatory member 23. In particular, opening pulley 74a and closing pulley 74b are mounted on opposite sides relative to rotation axis X-X, for example relative to cylindrical portion 28.

Unlike the embodiment described above, mechanism 18 cooperates with plug 16 through a gear 76, in particular through rotatory element 24. Preferably, rotatory element supports, at a distal end of its, a toothing 78 that meshes with a pinion 80 associated with plug 16, in particular coaxial thereto. Therefore, a rotation of rotatory member 23 operated by actuators 20 and 22 corresponds to an elastically constrained rotation of rotatory element 24, through which gear 76 controls the rotation of plug 16. In this embodiment, pinion 80 is supported by support structure 12 so as to rotate, in particular around an axis that is parallel to the rotation axis X-X.

In this embodiment, the rotation of rotatory element 24 is guided by support structure 12, in particular lever 50 is able to rotate by sliding in a recess 82 obtained on support structure 12, for example on half-shell 12b.

In this embodiment, lever 50 has a slot 84, which surrounds switching apparatus 42, which extends through the cavity defined from it.

Figure 10:
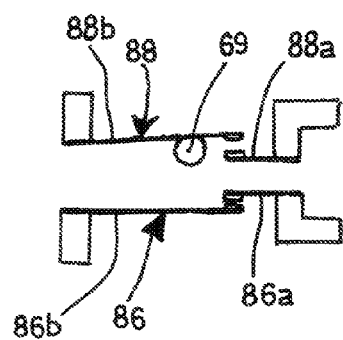
FIG. 10 is an enlarged schematic view of some details of the device shown in FIGS. 8 and 9.

With reference, in particular, to FIG. 10, the switching apparatus is a diverter switch 42. In particular, diverter switch 42 comprises an opening switch 86 and a closing switch 88, which are separate from one another and tend to remain close, so as to allow an electric current to be supplied through opening actuator 20 and through closing actuator 22, respectively, and which are suited to be opened by at least one between mechanism 18 and plug 16, when said mechanism 18 has moved said plug 16 to the opening position and to the closing position, respectively. As already mentioned above, in this embodiment mechanism 18 cooperates with switches 86 and 88, in particular by means of rotatory member 23.

With reference to FIG. 10, at least one between opening switch 86 and closing switch 88—but preferably both of them—comprises a respective fixed contact 86a and/or 88a and a movable contact 86b and/or 88b, which are constrained to support structure 12, wherein movable contact 86b and/or 88b can elastically lean against—and forcedly move way from—fixed contact 86a and/or 88a and, in so doing, is controlled by at least one between mechanism 18 and plug 16. In this embodiment, mechanism 18 controls the connection between fixed contact 86a and/or 86b and the respective movable contact 86b and/or 88b, in particular by means of rotatory member 23.

Figure 11:
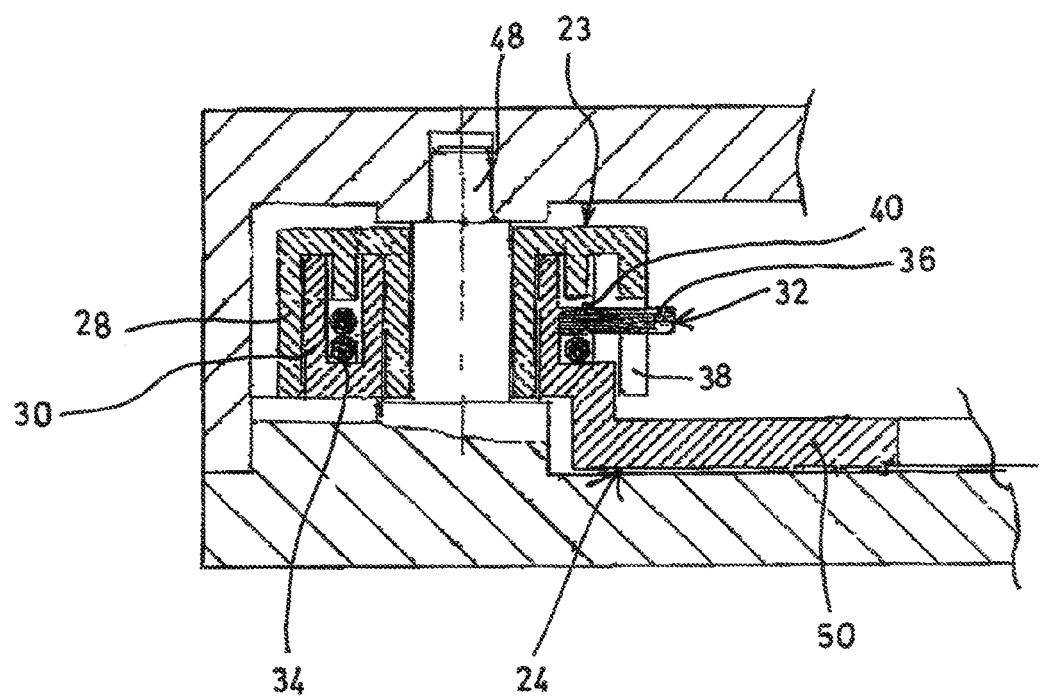
FIG. 11 is a partial cross-section view of the device shown in FIGS. 8 and 9.
Figure 11A:
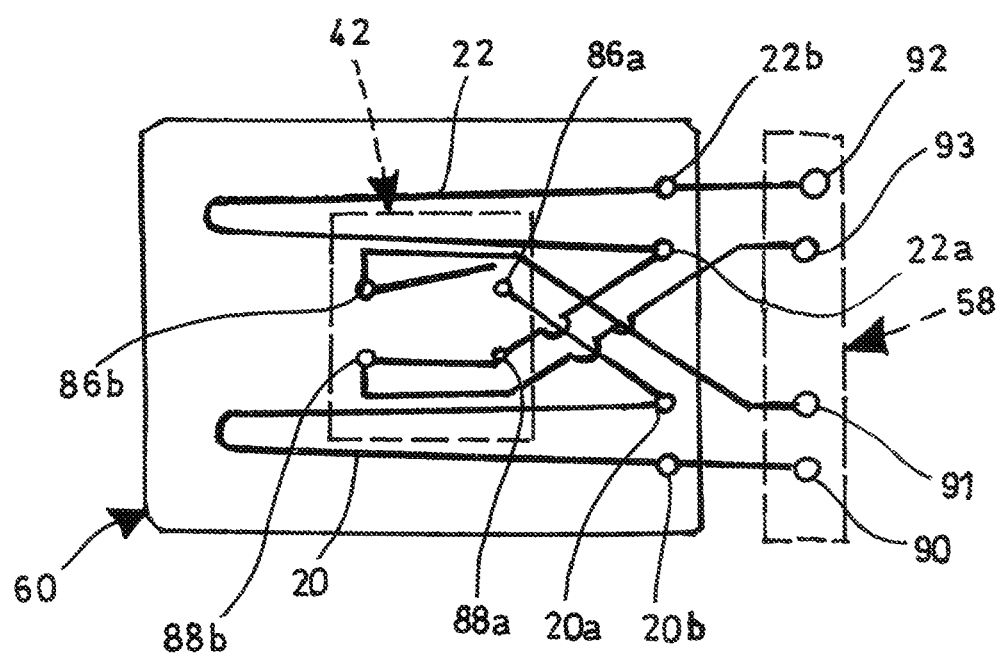
FIG. 11a is a schematic diagram representing an electrical control circuit associated with the device shown in the figures from 8 to 11.

In this embodiment, in FIGS. 10 and 11a, projection supported by rotatory member 23 (preferably by its prolongation 23c) pushes movable contact 86b away from fixed contact 86a, so as to spread them apart, thus interrupting a mutual electrical connection, when rotatory member 23 has been completely moved—by means of the activation of opening actuator 20—to the configuration corresponding to the opening position of plug 16. Simultaneously, in this step, projection 69 moves away from movable contact 88b, thus allowing it to elastically return against fixed contact 88a associated therewith, hence permitting a mutual electrical connection, so as to prepare closing actuator 22 for its subsequent activation.

Hence, when a closing electric current is transmitted, closing switch 88 is able to allow the electric current to flow towards closing actuator 22, which, in turn, is be able to control, by means of mechanism 18, the movement of plug 16 to the closing position.

Similarly, when rotatory member 23 has been completely moved—by means of the activation of closing actuator 22—to the configuration corresponding to the closing position of plug 16, projection 69 supported by rotatory member 23 (preferably by its prolongation 23c) pushes movable contact 88b away from fixed contact 88a, so as to spread them apart, thus interrupting a mutual electrical connection. Simultaneously, in this step, projection 69 moves away from movable contact 86b, thus allowing it to elastically return against fixed contact 86a associated therewith, hence permitting a mutual electrical connection, so as to prepare opening actuator 20 for its subsequent activation.

Hence, when a an opening electric current is transmitted, opening switch 86 is able to allow the electric current to flow towards opening actuator 20, which, in turn, is be able to control, by means of mechanism 18, the movement of plug 16 to the opening position. This corresponds to a return to the initial condition shown in FIG. 10.

With reference to FIG. 11a, in this embodiment the connection of the electric source of energizing current to actuators 20, 22 is performed by means of a four-way connection 58, namely through a pair of opening terminals 90 and 91, which are connected in series to opening actuator 20, in particular through respective contacts 20a-b, and opening switch 86, and a pair of closing terminals 92 and 93, which are connected in series to closing actuator 22, in particular by means of respective contacts 22a-b, and closing switch 88.

Therefore, the supply of opening electric current takes place by providing a difference of potential to opening terminals 90-91, so as to allow opening actuator 20 to be operated only when opening switch 86 is closed. On the other hand, the supply of closing electric current takes place by providing a difference of potential to closing terminals 92-93, so as to allow closing actuator 22 to be operated only when closing opening switch 88 is closed.

In this embodiment, springs 62 mechanically create an electrical contact between the pairs of contacts 20a-b and 22a-b and the rest of the control circuit, without acting as friction means for mechanism 18. Actually, the bistability of mechanism 18 is guaranteed by spring 70.

In this embodiment, the electrical connection between actuators 20 and 22, switches 86 and 88, and relative terminals 91-92 and 93-94 can be performed, in a known manner, using printed circuit board 60 provided with suitable tracks and housed in support structure 12.

With reference, in particular, to the figures from 12 to 14, the drawings show a device 210, which is manufactured according to a further embodiment of the present invention.

Device 210 shares many similarities with device 10 shown in the embodiment described above. In particular, in this embodiment, the coupling between rotatory member 23 and rotatory element 24, in mechanism 18, is performed in a manner that is substantially the same as the one of device 10 and 110. Furthermore, the structure of switching means 42 is substantially the same as the one of device 110.

Details and elements that are similar to those of the embodiments described above or fulfill a similar function are associated with the same alphanumeric references. For the sake of brevity, the description of these details and elements will not be repeated below, but reference is made to what was previously explained in the description of the previous embodiments, except for some main differences, which will be described in the following description.

In the figures from 12 to 14, valve device 210 is shown in a configuration of mechanism 18 corresponding to the closing position of plug 16 (in this case with switch 86 closed and switch 88 open).

Unlike the embodiment described above, in device 210, actuator wires 20, 22 do not define respective U-shaped paths, but their longitudinally intermediate segments rest on and are tangentially stretched on pulleys 74a, 74b, thus defining with them a reduced embracing angle.

Unlike the previous embodiment, in rotatory member 23, arms 23a and 23b laterally stem from a common branch 94 projecting from cylindrical portion 28. In particular, common branch 94 and arms 23a and 23b define a cross shape, which, at a distal end of common branch 94, is pivoted around axis X-X through cylindrical portion 28 and, at the opposite distal end of common branch 94, is elastically pushed by restraining means 28, in particular by spring 70.

Unlike the previous embodiment, lever 50 of rotatory member 24 does not have slot 84, since switching apparatus is arranged in a far position relative to rotatory member 24.

Unlike the previous embodiment, restraining means 28 do not operate on prolongation 23c of rotatory member 23, but, instead, the act upon common branch 94 by means of spring 70.

Figure 14:
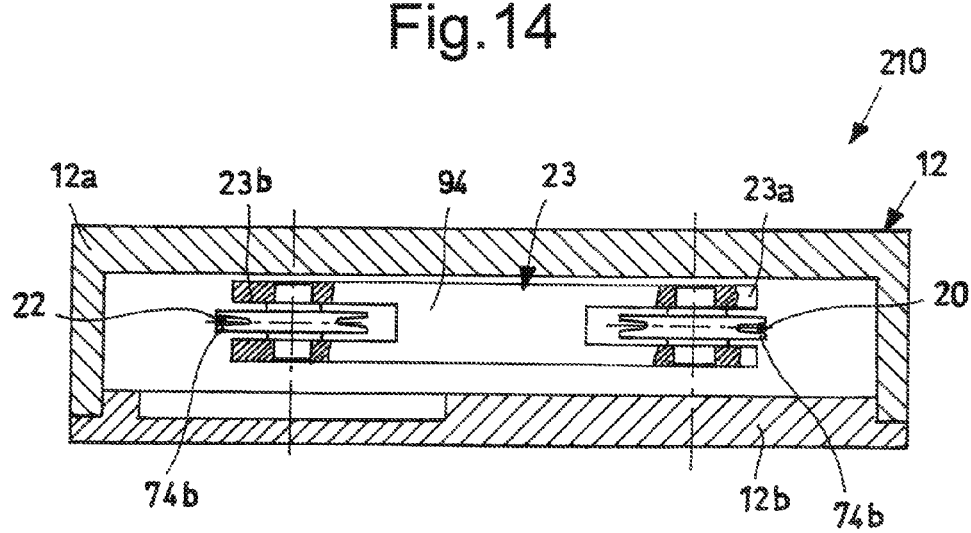
Figure 15:
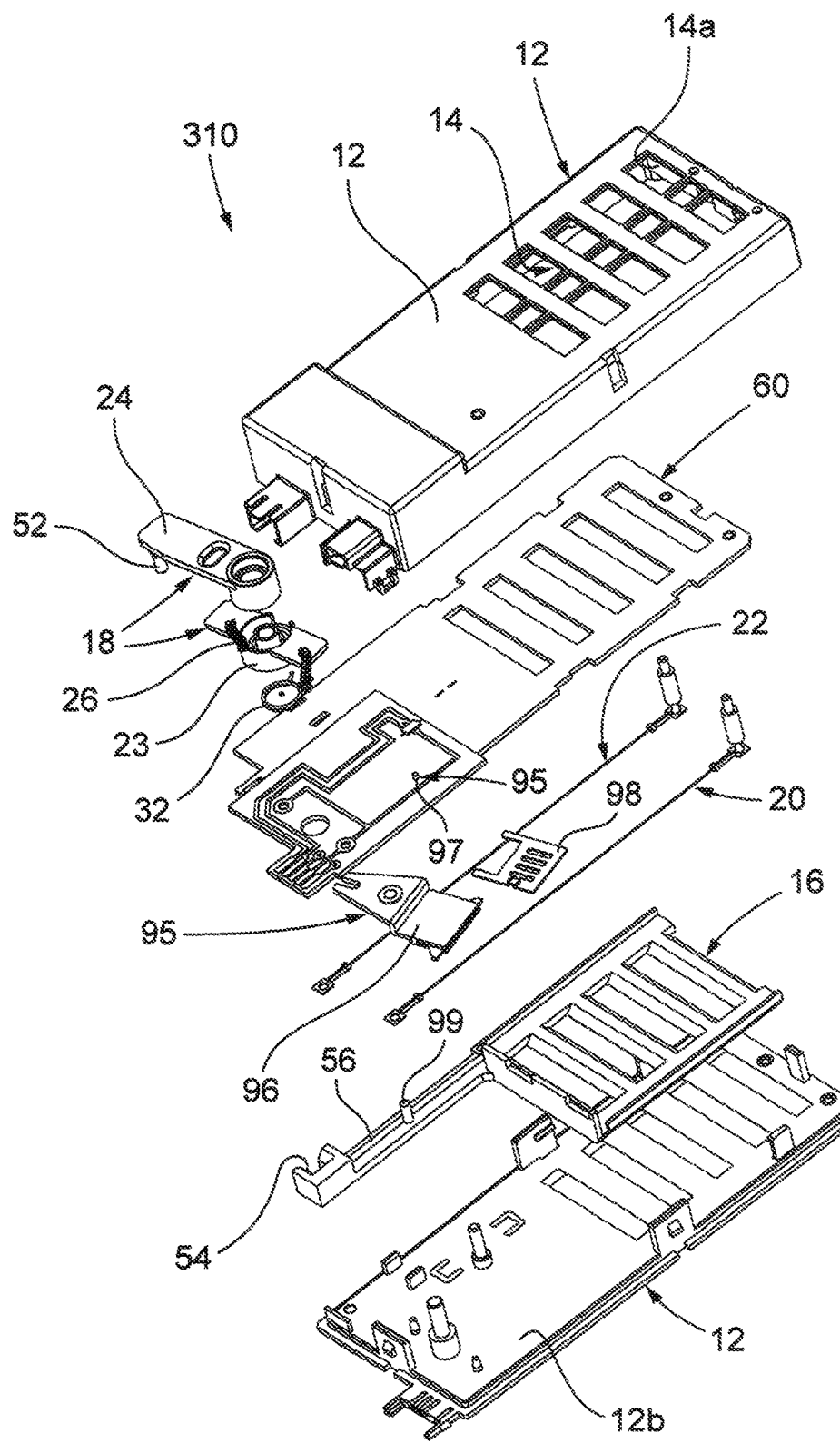
FIG. 15 is an exploded view of a further exemplary embodiment of a device according to the present invention.
Figure 16:
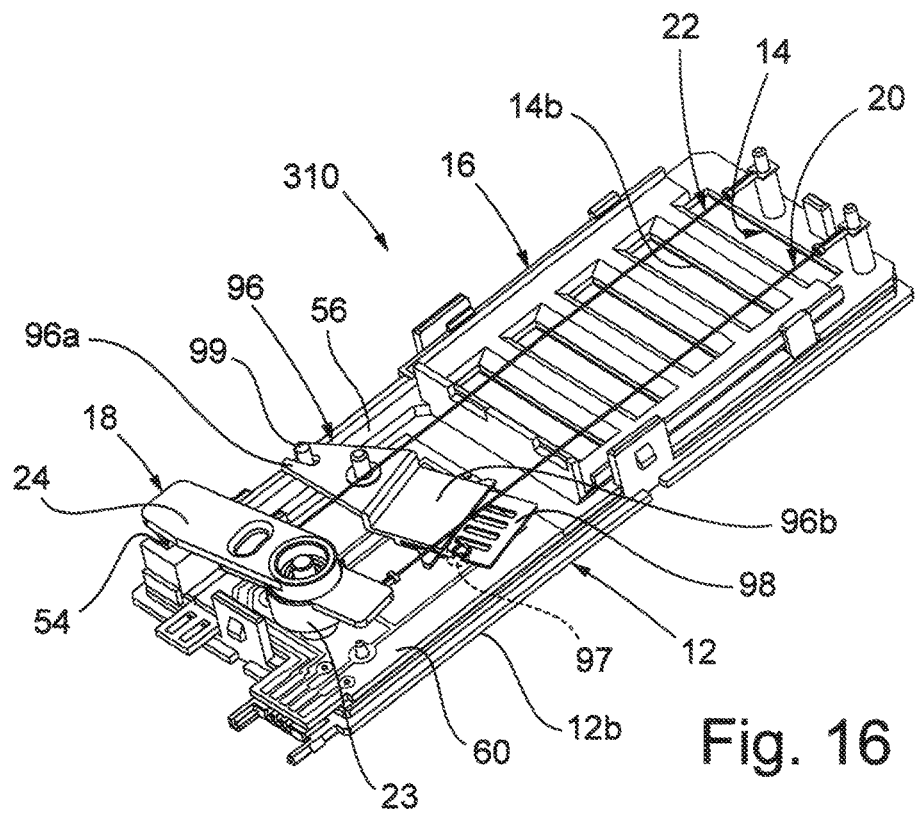
FIG. 16 is a view partially representing the device shown in FIG. 15.
Figure 17:
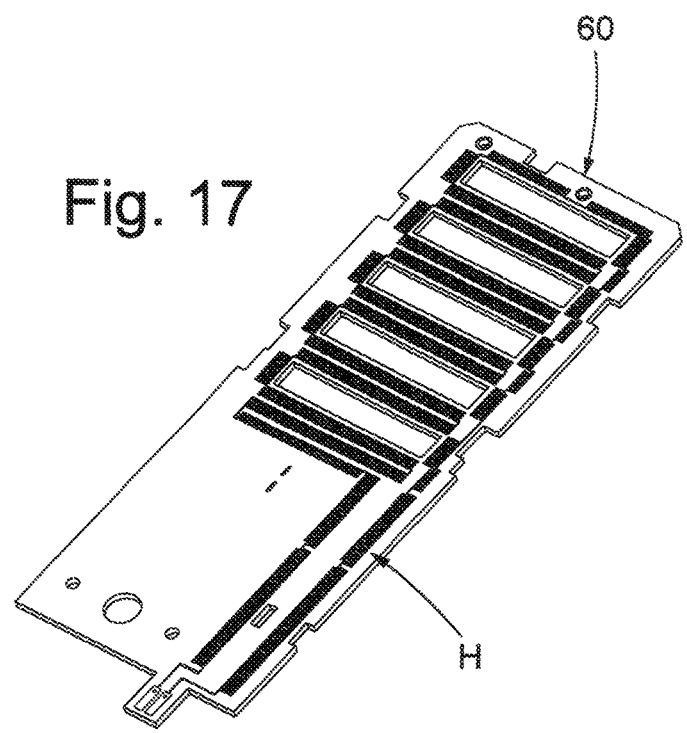
FIG. 17 is a view showing a component face of the device shown in FIGS. 15 and 16.

With reference, in particular, to FIG. 14, the drawing shows the structure of arms 23a, 23b of rotatory member 23, which is similar to the one of the previous embodiment. In this configuration, the central portion, which in this embodiment coincides with common branch 94, is solid, whereas each one of the lateral portions is made up of a pair of forks (details not numbered), between which a respective pulley 74a, 74b is pivoted.

As a person skilled in the art can clearly assume from the present description, the technical features characterizing the different versions and embodiments described and illustrated above can freely be exchanged with one another, provided that they are compatible.

Figure 12:
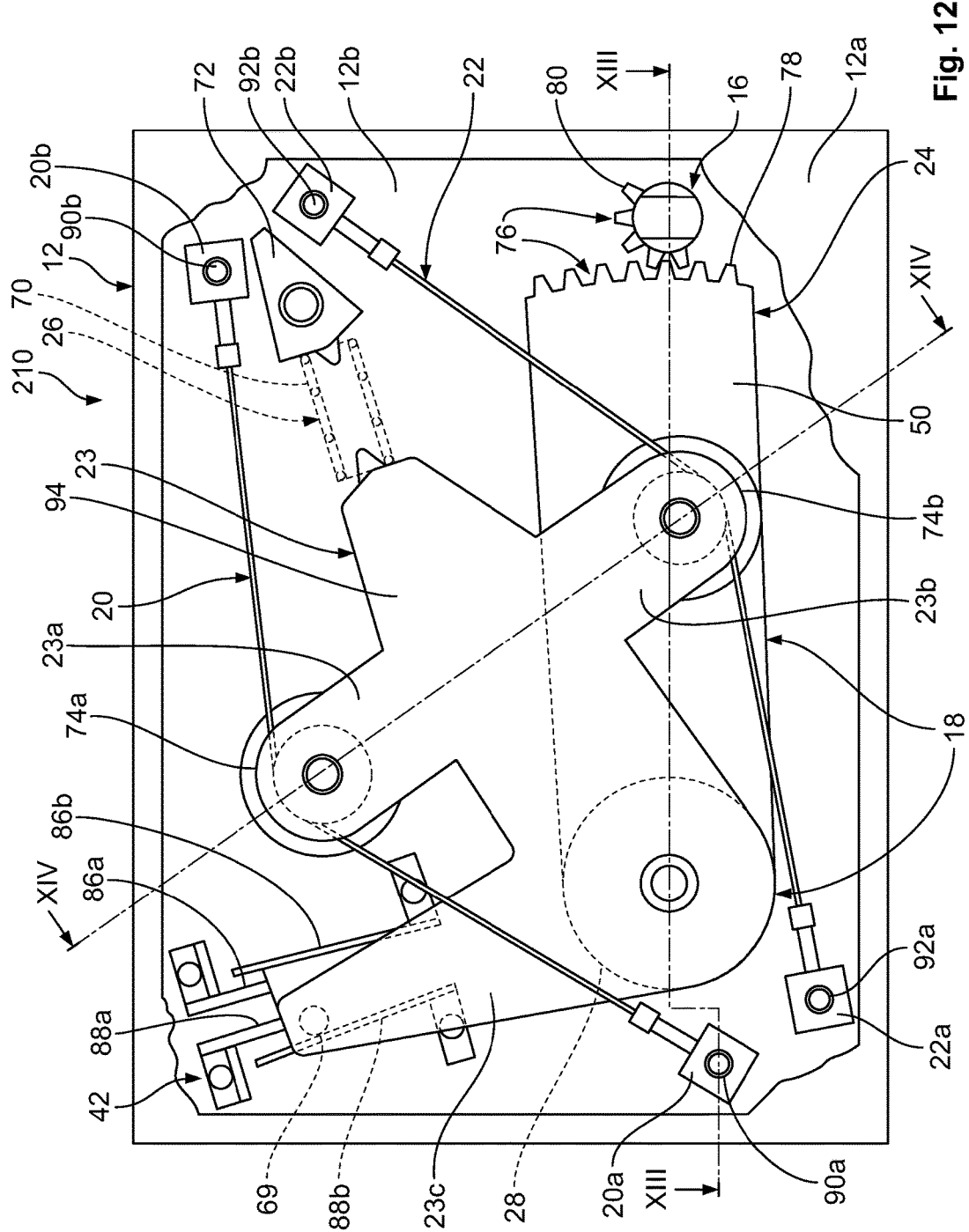
FIG. 12 is a plan view from the top partially showing, in a cutaway drawing, a further exemplary embodiment of a device according to the present invention.
Figure 13:
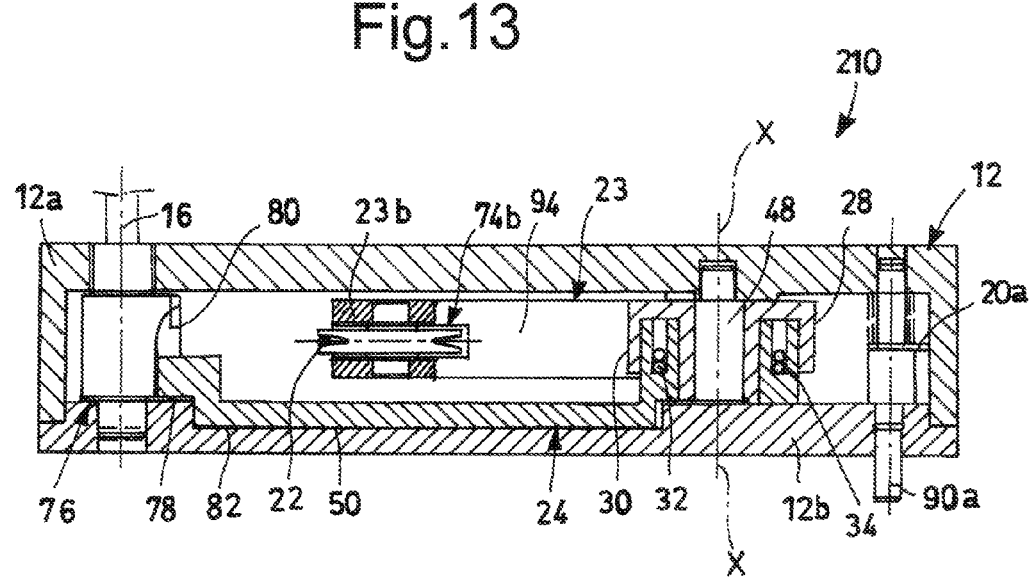
FIGS. 13 and 14 are cross-section views of the above-mentioned device obtained through the line XIII-XIII and the line XIV-XIV shown in FIG. 12.

For example, as far as switching apparatus 42 is concerned, the structure provided with two switches 86 and (embodiments shown in FIGS. 8-11, 11a and in FIGS. 12-14) can be replaced by the structure provided with a STD diverter switch (embodiment shown in FIGS. 1-7), and vice versa.

For example, the forced coupling connection of actuator wires 20, 22 to mechanism 18, in particular by means of pulleys 74a, 74b (embodiments shown in FIGS. 8-11, 11a and in FIGS. 12-14) can be replaced by the substantially "rigid" coupling connection of the wires to rotatory member 23 (embodiment shown in FIGS. 1-7).

With reference, in particular, to the figures from 15 to 17, the drawings show a device 310, which is manufactured according to a further embodiment of the present invention.

Device 310 shares many similarities with device 10 described with reference to the embodiment shown in the figures from 1 to 7.

In particular, in this embodiment, mechanism 18 is functionally identical to the one suggested for device 10. More in detail, the overall structure of mechanism 18 is preferably substantially identical, since the coupling between rotatory member 23 and rotatory element 24 is the same as the one described with reference to device 10.

Furthermore, the functional cooperation between mechanism 18 and opening 20 and closing 22 actuators takes place in a manner that is similar to the one described for device 10. Preferably, the structure and the mechanical connections between mechanism 18, in particular in correspondence to rotatory member 23, and opening 20 and closing 22 actuators are substantially identical to the ones described with reference to device 10.

Furthermore, the functional cooperation between plug and mechanism 18 takes place in a manner that is substantially similar to the one described for device 10. Preferably, the structure and the mechanical connections between plug 16, in particular in correspondence to prolongation 56, and mechanism 18, in particular in correspondence to rotatory element 24, are substantially identical to the ones described with reference to device 10.

Owing to the above, details and elements that are similar to those of the embodiments described above or fulfill a similar function are associated with the same alphanumeric references. For the sake of brevity, the description of these details and elements will not be repeated below, but reference is made to what was previously explained in the description of the previous embodiments, except for some main differences, which will be described in the following description.

Unlike the embodiment concerning device 10, in device 310, the switching apparatus, which is configured to operate in two stable positions (which means that the passage is completely open or completely closed), is left out.

In this embodiment, the control means comprise a position sensor 95, which is suited to directly affect the above-mentioned electric current supply as a function of the position assumed by plug 16, in particular by means of the cooperation with an external control unit, which is configured to supply electric current to at least one of actuators 20 and 22 in a controlled manner.

In this embodiment, position sensor 95 is suited to provide a signal indicating the position assumed in use by plug 16, in particular by interacting with at least one between mechanism 18 and—preferably—plug 16.

In particular, position sensor 95 comprises an actuating member 96 and a detecting apparatus 97, which is suited to interact with actuating member 96, so as to provide a signal indicating the position assumed by plug 16. In this embodiment, actuating member 96 and detecting apparatus 97 are mutually movable, wherein one of them (in particular actuating member 96) is mechanically constrained to at least one between mechanism 18 and plug 16, and the other one of them (in particular detecting apparatus 97) is mounted in a fixed manner on support structure 12. Obviously, in further embodiments that are not shown, actuating member 96 and detecting apparatus 97 can be switched, which means that the actuating member can be mounted in a fixed manner relative to support structure 12, whereas the detecting apparatus can be constrained to mechanism 18 or plug 16 in a movable manner relative to support structure 12.

Advantageously but not necessarily, position sensor 95 is a magnetoelectric sensor, for example it can be a Hall effect sensor or a magnetoresistive sensor.

In particular, in the above-mentioned magnetoelectric sensor 95, detecting apparatus 97 is configured so as to transmit, as an output, an electrical signal as a function of a variation of the magnetic flow caused by the relative movement between detecting apparatus 97 itself and actuating member 96. In particular, at least one between actuating member 96 and detecting apparatus 97 is able to generate a magnetic field, whose intensity actually detected by detecting apparatus 97 is a function of the magnetic interaction due to the position mutually assumed by actuating member 96 and by detecting apparatus 97.

In this embodiment, detecting apparatus 97 is able to generate a magnetic field, whereas actuating member 96 has a magnetoconductive portion 98, which is able to attract or deflect the streamlines of the above-mentioned magnetic field as a function of the mutual position of magnetoconductive portion 98 and of detecting apparatus 97. Therefore, a mutual movement between magnetoconductive portion 98 and detecting apparatus 97 causes an alteration in the magnetic field intensity actually detected by detecting apparatus 97, thus providing an indication of the corresponding variation of the position of plug 16. The alteration caused in the magnetic field detected by detecting apparatus 97 can be created in a predetermined manner by properly shaping the structure of magnetoconductive portion 98.

Alternatively, it is also possible to use an actuating member that generates a magnetic field (for example a magnet) and a detecting apparatus that is able to detect the variation of the magnetic field generated due to the mutual movement between the actuating member and the detecting apparatus.

In this embodiment, magnetoconductive portion 98 is manufactured as a sequence of hollow and solid sections (not numbered), which are adapted to alternate in a relation of magnetic interaction with detecting apparatus 97 as a function of the mutual movement between magnetoconductive portion 98 and detecting apparatus 97. In this way, detecting apparatus 97 is able to provide, as an output, an electrical impulse signal corresponding to the variation assumed by the magnetic field detected, wherein the number of impulses corresponds to the "discrete" position assumed by plug 16 due to the operation of opening actuator 20 or of closing actuator 22.

Advantageously, position sensor 95 is suited to be connected to an external control unit, which is configured to control the electric activation of opening actuator 20 and of closing actuator 22, so that position sensor 95 provides to the control unit, as an output, the signal indicating the position assumed by plug 16, which, in turn, was provided, in particular, by detecting apparatus 97. In this way, the external control unit can interrupt the activation of opening actuator 20 and of closing actuator 22, according to predetermined criteria, as a function of said electrical signal, for example when the electrical signal indicates that the desired position of plug 16 has been reached. In this way, for example, the control unit is able to control the movement of plug 16 to a desired position, which can be selected between:

the (complete) opening position,
the (complete) closing position, and
at least one intermediate position between the opening position and the closing position, by interrupting the activation of actuators 20, 22 as a function of said electrical signal received by the control unit. This aspect is particularly but not exclusively advantageous when using shape-memory actuators with friction means cooperating with plug 16 and/or mechanism 18, so as to hold it/them in the operating position that has actually been reached, thus preventing it/them from moving or returning to the complete opening position or the complete closing position. At the same time, in case there are shape-memory conductor wires acting as actuators, the elastic torsional constraint allows them to resume their appropriate tautness state in the possible intermediate positions.

Preferably, actuating member 96 is mounted so as to oscillate on support structure 12 and is controlled, during its rotation, by the movement of plug 16, since it is directly constrained to the latter or indirectly constrained thereto by means of mechanism 18. In particular, actuating member 96 is a rocker lever pivoted on support structure 12, wherein one arm 96a is constrained to at least one between plug 16 and/or mechanism 18, and opposite arm 96b cooperates with detecting apparatus 97.

In the embodiment shown, arm 96a of the rocker arm formed by actuating member 96 is constrained to plug 16, in particular by means of a kinematic mechanism that is similar to the one between plug 16 and mechanism 18, in particular rotatory member 24. In other words, plug 16 works as a pushing cursor, which can slide in a guided manner relative to support structure 12 and is able to push, thus causing it to rotate, arm 96a that acts as a crank coupled to plug 16 with a radial clearance. Preferably, arm 96a has a recess (not numbered), which is coupled with a clearance, for example in a sliding manner, longitudinally guided by arm 96a, a pin 99 projecting from plug 16, in particular from prolongation 56 of the latter.

In the embodiment shown, arm 96b of the rocker arm formed by actuating member 96 supports magnetoconductive portion 98, which, by way of example, is manufactured as a plate made of a ferromagnetic material, preferably provided with the sequence of hollow and solid sections mentioned above.

Preferably, device 310 also comprises heating means H, which are supported by support structure 12 and, in particular, are contained inside the casing defined by support structure 12. heating means H are suited to melt possible ice developing in the device, which might jeopardize the correct operation of plug 16, of mechanism 18, of actuators 20, 22, and—if available—of position sensor 95. Preferably, the heating means are suited to heat up the cavity obtained in support structure 12 before the activation of one of actuators 20, 22, so as to avoid a possible defective operation of device 310 due to the presence of ice, which might lead not only to a temporary fault (for example, an incorrect position of plug 16), but also to permanent failures and damages (for example of actuators 20, 22, in case the ice causes a jamming of mechanism 18 and/or of plug 16).

In this embodiment, heating means H can be connected to the external control unit, which controls device 310. Preferably, heating means H comprise a heating resistor, adapted to be flown through by an electric current, which, if necessary, is supplied by the external control unit in an instant that precedes the activation of one of actuators 20, 22. In particular, the heating resistor is directly built-in in printed circuit board 60, preferably on the face opposite to the one where there is obtained the circuit that is adapted to control the activation of actuators 20, 22.

Naturally, the principle of the present invention being set forth, the embodiments and the implementation details can be widely changed with respect to what described above and shown in the drawings as a mere way of non-limiting example, without in this way going beyond the scope of protection provided by the accompanying claims.

The invention claimed is:

1. Valve device for controlling cold air flow in a household appliance; said device comprising a support structure, on which the following elements are mounted:
   a plug arranged for assuming a plurality of operating positions including an opening position and a closing position, in which the plug is adapted to at least partially free and respectively obstruct a passage, which is configured for the fluid flow to pass through;
   a mechanism arranged for moving and holding said plug between said operating positions; and
   an opening actuator and a closing actuator, for separately acting on said mechanism;
   wherein said mechanism moves said plug towards said opening position and towards said closing position, respectively, due to an electric current which is supplied to said opening actuator and to said closing actuator respectively; said opening actuator and closing actuator comprise an opening electrical conductor and respectively a closing actuator, each of the opening electrical conductor and the closing conductor being made of a shape-memory alloy and constrained to said mechanism;
   wherein said mechanism comprises a rotary member rotatable around a rotation axis and on which said opening electrical conductor and said closing actuator act;
   wherein said rotary member fulfills a function of a rocker lever having an opening arm and a closing arm, which extend on opposite sides relative to said rotation axis;
   wherein the rotation of rotary member around said rotation axis is determined by operation of the opening electrical conductor and respectively of the closing electrical conductor, which act on opposite sides relative to said rotation axis upon said opening arm and respectively upon said closing arm;
   said mechanism comprises a rotary element torsionally constrained in an elastic manner to said rotary member and cooperating with said plug to move said plug to said opening position and to said closing position.

2. The device according to claim 1 comprising, furthermore, control means cooperating with at least one between said plug and said mechanism, and arranged for effecting on an electric current supplied to at least one between said opening actuator and said closing actuator as a function of the operating position assumed by said plug.

3. The device according to claim 2, wherein said control means are mounted on said support structure and comprise a switching apparatus arranged for directly effecting on the above-mentioned electric current as a function of the position of the plug.

4. The device according to claim 3, wherein said switching apparatus is arranged to prevent an electric current from being supplied to at least one between:
   said opening actuator, when said mechanism has moved said plug to said opening position; and
   said closing actuator, when said mechanism as moved said plug to said closing position.

5. The device according to claim 3, wherein said switching apparatus is configured to allow an electric current to be supplied to at least one between:
   said opening actuator, when said mechanism has moved said plug to said closing position; and
   said closing actuator, when said mechanism has moved said plug to said opening position.

6. The device according to claim 5, wherein said switching apparatus comprises a diverter switch adapted to be actuated by said at least one between said mechanism and said plug, so as to selectively direct an electric current through said opening actuator and said closing actuator, when said mechanism has moved said plug to said closing position and to said opening position respectively.

7. The device according to claim 6, wherein said diverter switch comprises an opening terminal and a closing terminal which are separate one from the other and are electrically connected to said opening actuator (20) and to said closing actuator respectively, and a common terminal adapted to be selectively connected to said opening terminal and to said closing terminal in a manner controlled by said at least one between said mechanism and said plug, when said mechanism has moved said plug to said closing position and to said opening position respectively.

8. The device according to claim 7, wherein said diverter switch is a micro-switch.

9. The device according to claim 6, wherein said diverter switch comprises an opening switch and a closing switch which are separate one from the other, which tend to allow an electric current to be supplied through said opening actuator and through said closing actuator respectively, and which are arranged to be opened by said at least one between said mechanism and said plug, when said mechanism has moved said plug to said opening position and to said closing position respectively.

10. The device according to claim 9, wherein at least one between said opening switch and said closing switch comprises a fixed contact and a movable contact which are constrained to said support structure, said movable contact tending to elastically rest against said fixed contact and being forcedly removable therefrom in a manner controlled by said at least one between said mechanism and said plug.

11. The device according to claim 2, wherein said control means comprise a position sensor arranged for indirectly effecting on said electric current as a function of a position assumed by said plug.

12. The device according to claim 11, wherein said position sensor is adapted to provide a signal indicating the position assumed by the plug by interacting with at least one between said mechanism and said plug.

13. The device according to claim 12, wherein said position sensor comprises an actuating member and a detecting apparatus arranged for interacting with said actuating member to provide a signal indicating the position assumed by the plug.

14. The device according to claim 13, wherein said actuating member and said detecting apparatus are mutually movable, wherein one of said actuating member and said detecting apparatus is mechanically constrained to at least one between said mechanism and said plug and the other one of said actuating member and said detecting apparatus is mounted in a fixed manner on said support structure.

15. The device according to claim 13, wherein said actuating member is mounted in a swingable manner on said support structure and is driven in rotation by movement of the plug; the actuating member is directly constrained to the support structure or indirectly constrained thereto by said mechanism.

16. The device according to claim 11, wherein said position sensor comprises a magnetoelectric sensor.

17. The device according to claim 15, wherein at least one between said actuating member and said detecting apparatus is adapted to generate a magnetic field, whose intensity detected by said detecting apparatus is a function of the magnetic interaction due to a position mutually assumed by said actuating member and by the detecting apparatus.

18. The device according to claim 17, wherein said detecting apparatus is adapted to generate a magnetic field and the actuating member has a magnetoconductive portion adapted to attract or deflect streamlines of the magnetic field as a function of the mutual position of said magnetoconductive portion and of the detecting apparatus.

19. The device according to claim 18, wherein said magnetoconductive portion is manufactured as a sequence of hollow and solid sections adapted to alternate in relation of magnetic interaction with said detecting apparatus as a function of the mutual movement between said magnetoconductive portion and said detecting apparatus.

20. The device according to claim 11, wherein said position sensor is adapted to provide the signal indicating the position assumed by said plug to an external control unit, which is configured to control the electric activation of the opening actuator and of the closing actuator according to predetermined criteria as a function of the signal.

21. The device according to claim 20, wherein said external control unit is adapted to interrupt activation of the opening actuator and of the closing actuator, when said signal indicates that the plug has reached a desired operating position between said opening position and said closing position.

22. The device according to claim 21, wherein said desired operating position is selectable among:
said opening position,
said closing position, and
at least one intermediate position between said opening position and said closing position.

23. The device according to claim 13, wherein said actuating member is mounted tiltable on said support structure and is controlled, during rotation, by movement of the plug; the actuating member is directly constrained to the plug or indirectly constrained thereto by said mechanism.

24. The device according to claim 23, wherein said actuating member is a rocker lever pivoted on the support structure, wherein one arm is constrained to at least one between the plug and the mechanism, and the opposite arm cooperates with the detecting apparatus.

25. The device according to claim 1, further comprising heating means supported by said support structure and arranged to melt ice that can prevent at least one among said plug, said mechanism and said actuators from properly working.

26. The device according to claim 25, wherein said heating means comprise a heating resistor, to be passed through by current.

27. The device according to claim 1, wherein said electrical conductor has an oblong shape and is arranged to assume an extended and de-energized normal condition and a contracted and energized working condition, in which said electrical conductor moves said mechanism bringing said plug to said opening position or to said closing position.

28. The device according to claim 1, wherein said rotary member and said rotary element are torsionally constrained around the same rotation axis.

29. The device according to claim 28, wherein said rotary member and said rotary element have respective cylindrical portions, which are rotationally coupled to one another and between which elastic means are interposed, which tend to hold said rotary member and said rotary element in a predetermined mutual angular position.

30. The device according to claim 29, wherein said elastic means comprise a torsionally loaded spring annularly interposed between said cylindrical portions, so as to torsionally constrain said rotary member and said rotary element.

31. The device according to claim 30, wherein said spring is a helical spring and is housed in an annular cavity defined in one of said cylindrical portions; said spring having ends acting on both said cylindrical portions.

32. The device according to claim 31, wherein said ends extend through respective peripheral grooves facing one to the other and made on said cylindrical portions; said ends resting on the edges defined by said peripheral grooves.

* * * * *